June 22, 1965 J. W. GILBAUGH 3,190,030
ANIMAL TRAP
Filed April 10, 1964 2 Sheets-Sheet 1
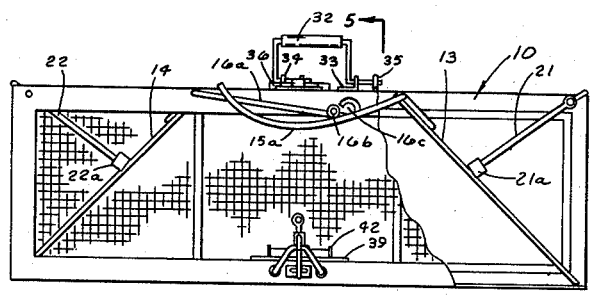
FIG._1
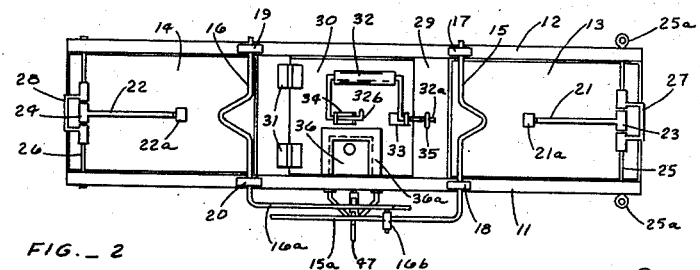
FIG._2
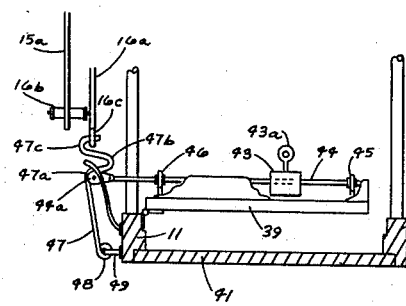
FIG._4
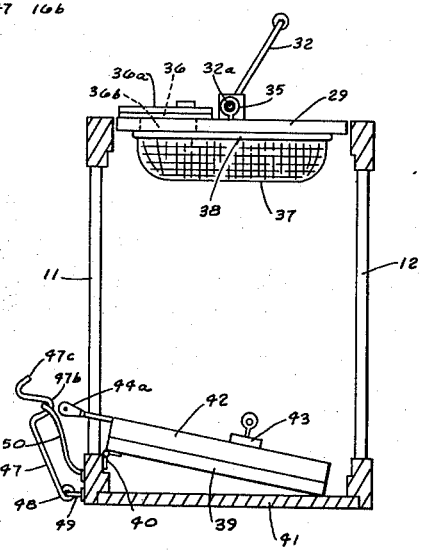
FIG._5
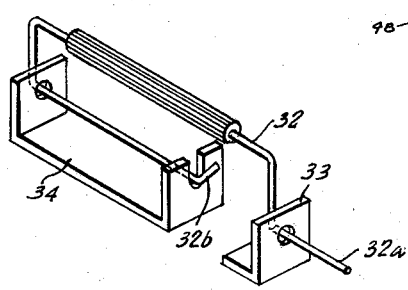
FIG.9
INVENTOR.
JOHN W. GILBAUGH
BY June 22, 1965  J. W. GILBAUGH  3,190,030
ANIMAL TRAP
Filed April 10, 1964  2 Sheets-Sheet 2
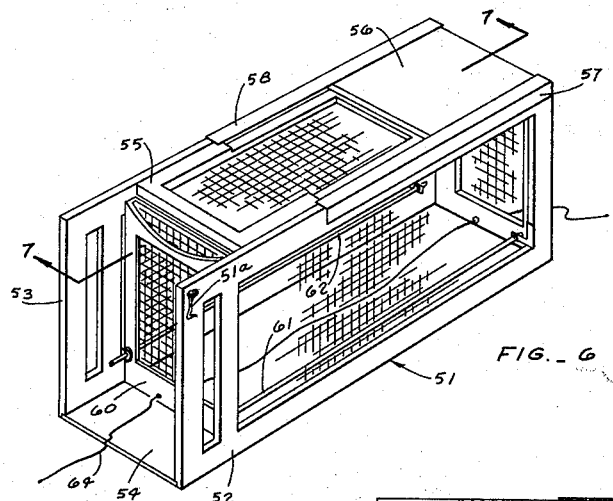
FIG._6
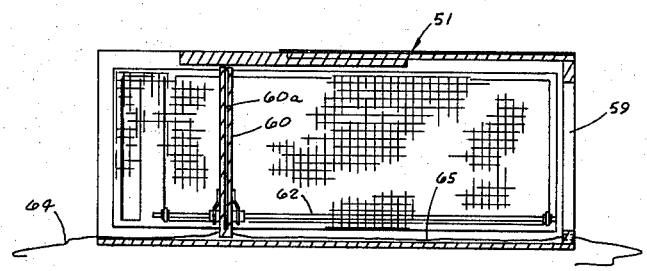
FIG._7
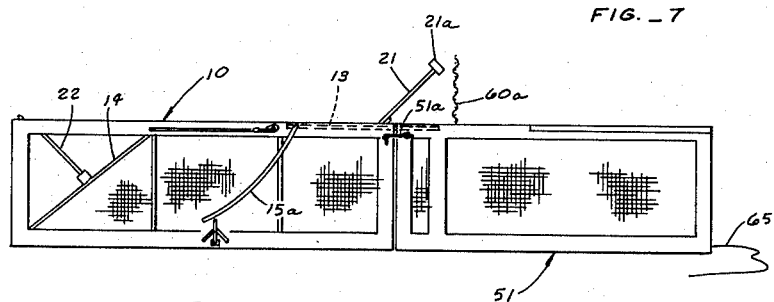
FIG._8
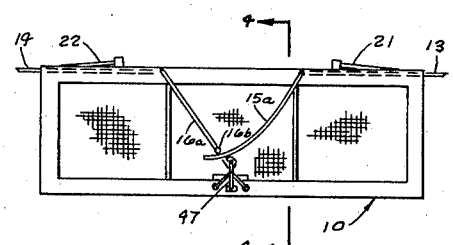
FIG._3
INVENTOR.
JOHN W. GILBAUGH
BY
Allen and Strong

United States Patent Office 3,190,030
Patented June 22, 1965

3,190,030
ANIMAL TRAP
John W. Gilbaugh, 19396 Monte Vista Drive,
Saratoga, Calif.
Filed Apr. 10, 1964, Ser. No. 358,891
10 Claims. (Cl. 43—61)

This invention relates to improvements in animal traps of the cage type in general. More particularly, this invention relates to cage type animal traps constructed for trapping animals and birds ranging in size from mice and sparrows to medium sized fur-bearing animals and large owls and hawks, that is also provided with a removable cage attachment for facilitating removal of the trapped animals and birds alive and unharmed therefrom.

An object of this invention is to provide a cage type animal trap and removable cage whereby the captured animal may be removed from the trap without injury thereto.

Another object of this invention is to provide an improved cage type trap which may be adjusted for trapping small animals or birds or larger animals through the provision of means for adjusting the sensitivity of the bait holder of the trap, whereby the need for a variety of sizes of traps is eliminated.

Still another object of this invention is to provide an improved cage type animal trap in which the mechanism for operating the trap is tripped by the animal or bird attempting to remove bait from the bait holder without actually standing on the bait holder.

A further object of this invention is to provide an improved cage type animal trap with doors on either end which close simultaneously and lock in closed position when the bait holding mechanism thereof is actuated.

Still a further object of this invention is to provide an improved cage type trap which has an access door on the top to permit easy access to the bait holding mechanism for adjustment thereof, said access door also having positioned on the bottom sides thereof a small cage to serve as a live bait holder.

Still another object of this invention is to provide an improved cage type trap with an access door in the top thereof positioned above the trap trip mechanism, said access door being provided with a small cage for holding live bait, said access door also having a small sliding door through which access to the live bait cage may be obtained, whereby the live bait may be inserted into the bait cage after the access door is closed and after the trap is set.

Still another object of this invention is to provide an improved cage type trap with an animal removal cage that can be economically and efficiently manufactured in any desired size and is dependable and durable in operation.

Other and further objects and advantages of this invention will be apparent to those skilled in the art to which it relates from the following specification, claims and drawing, in which, briefly:

FIG. 1 is a side view of the cage trap of this invention;

FIG. 2 is a top view of an embodiment of the cage type animal trap of this invention;

FIG. 3 is a side view of the trap showing the door operating mechanism thereof in set position;

FIG. 4 is a sectional view taken along the line 4—4 of FIG. 3;

FIG. 5 is a sectional view taken along the line 5—5 of FIG. 1 to the trap trigger mechanism tripped;

FIG. 6 is a perspective view of the animal removal cage;

FIG. 7 is a longitudinal sectional view of the animal removal cage;

FIG. 8 is a side view of the removal cage attached to the trap; and

FIG. 9 is a perspective view, on an enlarged scale, of the handle structure.

Referring to the drawing in detail, reference numeral 10 designates a cage 10 of elongated configuration which is provided with side frame members 11 and 12 that may be made of wood or metal which has heavy wire screen attached thereto so that the inside of the cage may be inspected therethrough. Doors 13 and 14 are provided to the end portions of the cage, and when these doors are closed they are in the inclined position with the upper ends thereof supported by the rods 15 and 16 and the lower ends thereof resting on the floor of the cage, which may be made of wood or metal as desired. The rods 15 and 16 have the end portions thereof positioned in suitable holes or notches provided in or on the upper members of the sides 11 and 12. If the rods 15 and 16 are positioned in notches in said members, then they are held in the respective notches by means of plates 17, 18, 19 and 20 which are attached to the frame members by suitable screws, welding or the like.

When the doors 13 and 14 are closed, they are in their inclined positions as shown in FIG. 1. Locking members 21 and 22 which slidably engage the doors 13 and 14, respectively, are provided for holding the doors in their closed position. One end of locking member 21 is attached to a sleeve 23 which is positioned on the rod 25 that is held on the top of the cage in suitable holes formed in the side members 11 and 12. The other end of the locking member 21 is provided with a weight 21a that is adapted to engage the door 13 in a suitable recess when the door is in its closed position. When it is desired to open this door, locking member 21 is raised and tilted on its pivoting rod 25 so that it engages the U-shaped member 27 which is attached to the rod 25 on either side of the sleeve and supports the locking member in its raised position. The locking member 22 is constructed the same as locking member 21. Locking member 22 is provided with a weight 22a attached to one end thereof and this weight engages the door 14 in a suitable recess when the door is in its closed position. The other end of the locking member 22 is attached to a sleeve 24 which is positioned on the rod 26 that is supported in suitable holes formed in the side frame members 11 and 12. The U-shaped member 28 is fixedly attached to the rod 26 on opposite sides of the sleeve 24. U-shaped member 28 is provided to support the locking member 22 in its raised position.

This trap is also provided with a service door 30 in the top thereof and this door is attached by hinges 31 to said top 29. A handle 32 is attached to the door 30 by the pivoting members 33 and 34 which are provided with suitable holes for receiving the lower parts 32a and 32b of the handle. These lower parts 32a and 32b are slidable in the pivoting members 33 and 34 a short distance such that the end of the part 32a may be either inserted into a hole formed in the latching member 35, or it may be withdrawn therefrom. Thus the handle 32 may be used for locking the door 30 to the top 29, or it may be shifted a short distance to disengage the end portion of part 32a from the latching member 35 so that the door 30 may be opened. When the handle is lying on the top of the door 30 and the part 32a thereof is latched in member 35, part 32b of the handle adjacent to pivoting member 34 is lodged in a recess provided in member 34 to prevent lateral movement of the handle.

The door 30 is provided with a smaller door 36 which is slidable in a frame 36a that is fixedly attached to the top of the door 30. The door 36 may be opened only when the door 30 is raised sufficiently so that the door 36 clears the upper edge of the frame 11. The door 36 covers an opening 36b in the door 30, and this latter opening leads to the cage 37 made of wire screen. This cage is attached to the bottom surface of door 30 by a wire member 38 by suitable screws or the like for the purpose of holding small live bait inside of the trap and such live bait may be inserted into this cage through the opening 36b.

This trap is provided with a bait supporting plate 39 which is pivotally attached to the lower part of the side member 11 by hinges 40. A wall member 42 is attached to the top of the bait supporting plate 39, and this wall member is positioned a short distance inward from the sides of the plate 39 so that small animals, birds and the like to be trapped in this device must actually get on the plate 39 in order to reach the bait inside of the wall member 42. This is not so important with larger animals because they actuate the plate 39 to release the trigger mechanism simply by their eating activity.

A latching rod 44 is attached by the apertured members 45 and 46 to the top of the bait supporting plate 39. A slidable weight 43 is positioned on the rod 44 and this weight is provided with a screw 43a that is threaded thereinto and holds the weight in a selected position on the rod when it is screwed into the weight so that it engages the rod 44. The outer end of the rod 44 is provided with a roller 44a which engages the trigger member 47 in the curved part 47a therof when the trap is set, as will be described hereinafter. The lower end of the member 47 is provided with a loop 48 that receives the fastening member 49 whereby the member 47 is attached to the frame 11 of the trap. The member 47 is provided with several bent parts 47a, 47b and 47c, as shown in FIGS. 4 and 5. Parts 47a is shaped so that it engages the roller 44a over a substantial part of the circumference thereof. Thus this roller may be retained under this bent part 47a when the bait plate 39 is in its raised position, and the trap is set as shown in FIG. 4. When the trap is set, rod 44, roller 44a and bent part 47a cooperate to hold the bait plate 39 in this elevated position until additional weigh such as that provided by the animal or bird to be trapped gets on the bait plate 39, and the impact of this additional weight is sufficient to move the plate 39 downward on its pivots 40 and cause the roller 44a to roll along the bent part 47a toward the bent part 47b. The amount of additional weight required to spring the trap may be adjusted by moving the weight 43 further toward the free end of the plate 39.

The door supporting rods 15 and 16, which are employed for pivotally attaching the inner ends of the doors 13 and 14, respectively, to the side members 11 and 12 of this device, are provided with extensions or arms 15a and 16a, respectively, positioned at the side of the device. When the doors 13 and 14 are in their closed positions, these arms 15a and 16a are in substantially horizontal positions, as shown in FIG. 1. On the other hand, when the trap is set, that is, when the doors 13 and 14 are in their elevated positions, the arms 15a and 16a are angled downward as shown in FIG. 3, and these positions allow the roller 16b that is rotatably supported on the arm 16a to press against the arm 15a to hold the latter in its downwardly extending position.

The lower end of arm 16a is provided with a loop 16c which is adjacent to the roller 16b, and this loop is adapted to receive the hook 47c on the end of the member 47 which holds the arm 16a in its downwardly extending position. Thus the member 47 in cooperation with the arms 15a and 16a holds the trap doors 13 and 14 in their raised positions when the trap is set, that is, when the bait plate 39 is in its raised position and the roller 44a engages the latch member 47 in the bent part 47a, as shown in FIG. 4. When the trap doors 13 and 14 are in their raised positions, the locking members 21 and 22 associated therewith have the weights 21a and 22a thereof, respectively, resting on the top parts of the doors adjacent to the pivots thereof.

When the trap is sprung, that is, an animal to be captured attempts to remove bait from the bait plate 39 so that the member 47 is released and the hook part 47c thereof is disengaged from the loop 16c of the arm 16a, the doors 13 and 14 move downward to their closed positions and the weights 21a and 22a slide down the doors 13 and 14, respectively, to the weight receiving recesses of these doors whereby the doors 13 and 14 are locked in their closed positions.

An important feature of this invention is the provision of an arm 15a of arcuate configuration. It will be noted that when the doors 13 and 14 are in their open position and the arms 15a and 16a are pointed downward, the roller 16b and is carried by the arms 16a engages the arm 15a and holds the latter arms in its downward position. However, when the trap is sprung by an animal entering therein and actuating the bait plate 39 so that the member 47c is disengaged from the loop 16c of the arm 16a, it is necessary that both doors 13 and 14 close simultaneously; thus, the arm 15a is made of arcuate configuration so that the simultaneous closure of doors 14 and 15 is possible. In other words, if the arm 15a were made of straight shape, this simultaneous closure would not be possible because the roller 16b would have to advance upward along the arm 15a some distance before door 13 could start to close.

After an animal is captured in the trap, it must be removed therefrom, and another important feature of this invention is the provision of a trap attachment 51 for use in removing the captured animal. The removal cage 51 is provided with side members 52 and 53, a bottom 54 and a top 55. The side members 52 and 53 may be made of suitable frames which are provided with screen or wire netting. The bottom is made of a solid piece of wood or metal and it is coextensive with the side members 52 and 53, that is, it is of the same length as these side members. The top 55, on the other hand, is shorter than the side members so that when the left-hand end of the cage is brought up against the right-hand end of the trap, as shown in FIG. 8, and the hooks 51a provided to the upper lefthand corners of side members 52 and 53 are hooked onto the projecting ends 25a of the rod 25 of the trap, the door 13 of the trap may be opened into the upper left-hand end of the cage.

After the removal cage 51 is joined to the trap 10, as described, and the door 13 of the trap is opened, as shown in FIG. 8, the slidable screen panel 60a of the partition member 60 is pulled upward out of the partition member. The member 60 is provided with grooved frame members for slidably receiving the screen panel 60a so that this panel may be readily removed by gripping the upper end thereof and pulling it out of the frame. Thus, the animal trapped in the trap 10 may then enter the removal cage 51 after the panel 60a is pulled out of the frame 60. After the animal enters the removal cage 51, the panel 60a is reinserted into the frame 60. The frame 60 is slidably supported on parallel rods 61 and 62 that are attached to the side members 52 and 53, respectively, and a rope or cord 65 is attached to the frame 60, so that after the trapped animal is in the removal cage 51, the panel 60 with its screen 60a may be moved to the right by pulling on this cord. Thus, the animal is urged toward the right-hand end of the removal cage adjacent to the end panel 59 thereof.

After the animal is thus confined, the removal cage 51 may be detached from the trap cage 10 by unhooking the members 51a from the trap. The removal cage then is free to be moved for disposal of the animal. If the animal is to be kept alive it may be transferred easily from the removal cage to suitable accommodations; if it is to be destroyed, this may be done by either drowning or gassing the animal by immersing the right-hand end of the removal cage in a tub of water or by inserting the removal cage into a plastic gassing bag. The dead animal carcass is then removed from the removal cage through the slidable panel 56 provided to the top of the cage. This panel 56 slides under the angle-shaped members 58, which are attached to the upper edges of the side members 61 and 62, respectively. The slidable frame 60 is then moved toward the left-hand end of the cage by pulling on the cord 64.

While I have shown a preferred embodiment of the invention it will be understood that the invention is capable of variation and modification from the form shown so that its scope should be limited only by the scope of the claims appended hereto.

What I claim is:

1. An animal trap comprising a cage having side walls, top and bottom and a door closing each end of said cage, said top being substantially shorter than said side walls, means attaching the sides of said top to the upper central parts of said side walls, pivoting means secured to each of said doors for pivotally supporting each of said doors on said side walls adjacent to the ends of said top, each of said pivoting means including an arm extending downwardly along one of said side walls in such manner that when the arm is moved downwardly the door attached thereto will open, roller means attached to one of said arms near the free end thereof, said arms extending downward along said one side wall when said doors are in open position, bait holding means pivotally supported in said cage substantially in the central part thereof for movement between an elevated and lowered position, trigger means on said cake for releasably engaging said one of said arms for holding it in its downwardly extended position, said bait holding means having latch means extending out of said cage for engaging said trigger means when said bait holding means is in its elevated position and for releasing said trigger means from said one of said arms when said bait holding means is in its lowered position, said roller means engaging the other one of said arms when said arms are in their downwardly extending positions whereby said doors are held in their open positions, said other one of said arms being concaved upwardly in a vertical plane and said roller means bears against this concave surface of said other one of said arms during the closing of said doors after said trigger means is released so that said roller means does not delay the closing of the door held in its open position by said other one of said arms.

2. An animal trap as set forth in claim 1 further comprising a service door in said top, said bait holding means being positioned below said service door whereby bait may be readily positioned thereon through said service door.

3. An animal trap as set forth in claim 2 further characterized in that said latch means includes a rod attached to said bait holding means, a weight positioned on said rod, said weight being adjustable so that said bait holding means may be tripped from its elevated position by animals of different sizes.

4. An animal trap as set forth in claim 2 further comprising a small live bait cage made of wire mesh attached to the underside of said service door for holding the live bait over said bait holding means.

5. An animal trap as set forth in claim 1 further characterized in that said bait holding means comprises a plate having a central area for receiving the bait enclosed by a wall such that the animal must step upon a marginal area of the plate before reaching the bait.

6. An animal trap as set forth in claim 1 further comprising door locking means for each of said doors, said doors being elevated to horizontal positions when they are open and being inclined when they are closed, said door locking means comprising weight members that slide on said doors when said doors are falling into their closed positions to accelerate closing thereof.

7. An animal trap as set forth in claim 2 further comprising a handle, means pivotally attaching said handle to said service door for carrying said cage, latching means for said service door attached to said handle and including a holding member attached to said top, said handle being slidable in said last mentioned pivoting means so that it may be shifted into or out of engagement with said holding member when said service door is to be locked or when it is to be opened.

8. An animal trap comprising a main cage having side walls, top and bottom and a pair of doors, each of said doors closing one end of said cage, said top being substantially shorter than said side walls, means attaching the sides of said top to the upper central parts of said side walls, pivoting means secured to each of said doors pivotally supporting each of said doors on said side walls adjacent to the ends of said top, each of said doors being in their horizontal positions when they are open and having the free ends thereof etxending beyond the ends of the main cage, each of said pivoting means including an arm extending downwardly along one of said side walls in such manner that when the arm thereof is moved downwardly the door attached thereto will open, bait holding means pivotally supported in said cage for movement between an elevated and lowered position, trigger means on said cage for releasably engaging one of said arms for holding it in its downwardly extended position, said bait holding means having latch means engaging said trigger means when the trap is set for trapping an animal, an auxiliary cage for removing the trapped animal from said main cage, said auxiliary cage having side walls, a partial top member, bottom, end wall and a movable partition, one end of said auxiliary cage being open, means for attaching the open end of said auxilary cage to one end of said main cage so that side walls of said main cage substantially abut the side walls of said auxiliary cage and so that the door of said main cage adjacent to said auxiliary cage may be opened to extend into said auxiliary cage up to said partial top member, said movable partition having an opening through which the trapped animal is caused to move into said auxiliary cage, means for closing said opening after said trapped animal is in said auxiliary cage, and means for moving said partition toward the closed end of said auxiliary cage for limiting the movement of said trapped animal.

9. An animal trap comprising a main cage having side walls, top and bottom and a pair of doors, each of said doors closing one end of said cage, said top being substantially shorter than said side walls, means attaching the sides of said top to the upper central parts of said side walls, pivoting means secured to each of said doors for pivotally supporting each of said doors on said side walls adjacent to the ends of said top, each of said doors being in a horizontal position when open, the free ends of said doors extending beyond the respective ends of the cage when said doors are in open positions, each of said pivoting means including an arm extending downwardly along one of said side walls in such manner that when the arm is moved downwardly the door attached thereto will open, roller means attached to one of said arms near the free end thereof, said arms extending downward along said one side wall when said doors are in open position, bait holding means pivotally supported in said cage substantially in the central part thereof for movement between an elevated and lowered position, trigger means on said cage for releasably engaging said one of said arms for holding it in its downwardly extended position, said bait holding means having latch means extending out of said cage for engaging said trigger means when said bait holding means is in its elevated position and for releasing said trigger means from said one of said arms when said bait holding means is in its lowered position, said roller means engaging the other one of said arms when said arms are in their downwardly extending positions whereby said doors are held in their open positions, said other one of said arms being concaved upwardly in a vertical plane and said roller means bears against this concave surface of said other one of said arms during the closing of said doors after said trigger means is released so that said roller means does not delay the closing of the door held in its open position by said other one of said arms, an auxiliary cage for removing the trapped animal from said main cage, said auxiliary cage having side walls, a partial top member, bottom, end wall and a movable partition, one end of said auxiliary cage being open, means for attaching the open end of said auxiliary cage to one end of said main cage so that side walls of said main cage substantially abut the side walls of said auxiliary cage and so that the door of said main cage adjacent to said auxiliary cage may be opened to extend into said auxiliary cage up to said partial top member, said movable partition having an opening through which the trapped animal is caused to move into said auxiliary cage, means for closing said opening after said trapped animal is in said auxiliary cage, and means for moving said partition toward the closed end of said auxiliary cage for limiting the movement of said trapped animal.

10. An animal trap comprising a cage having side walls, top and bottom and a door closing at least one end of said cage, said top being substantially shorter than said side walls, means attaching the sides of said top to the upper central parts of said side walls, pivoting means secured to said door for pivotally supporting said door on said side walls adjacent to the corresponding end of said top, said pivoting means including an arm extending downwardly along one of said side walls in such manner that when the arm is moved downwardly the door attached thereto will open, bait holding means pivotally supported in said cage substantially in the central part thereof, said bait holding means having an elevated position and a lowered position, trigger means pivotally attached to said cage, said bait holding means having a rod attached thereto extending out of said cage, said trigger means having a cam portion, said rod having means engaging said cam portion when said trigger means is in engagement with said arm for holding said arm in its downwardly extending position when said bait holding means is in its elevated position, a weight positioned on said rod, the position of said weight on said rod being adjustable so that said bait holding means may be tripped from its elevated position by animals of different sizes.

References Cited by the Examiner

UNITED STATES PATENTS

| | | | |
|---|---|---|---|
| 2,374,522 | 4/45 | Andrews | 43—61 |
| 2,587,748 | 3/52 | Merkl | 43—61 |

ABRAHAM G. STONE, *Primary Examiner.*